(12) United States Patent
Zhang (10) Patent No.: US 12,506,143 B2
(45) Date of Patent: Dec. 23, 2025

(54) ELECTRODE PLATE, ELECTROCHEMICAL APPARATUS, AND ELECTRONIC APPARATUS

(71) Applicants: Ningde Amperex Technology Limited, Fujian (CN); Dongguan Amperex Technology Limited, Guangdong (CN)

(72) Inventor: Yuanjie Zhang, Ningde (CN)

(73) Assignees: Ningde Amperex Technology Limited, Ningde (CN); Dongguan Amperex Technology Limited, Dongguan (CN)

(*) Notice: Subject to any disclaimer, the term of this patent is extended or adjusted under 35 U.S.C. 154(b) by 509 days.

(21) Appl. No.: 18/192,908

(22) Filed: Mar. 30, 2023

(65) Prior Publication Data

US 2023/0238519 A1 Jul. 27, 2023

Related U.S. Application Data (63) Continuation of application No. PCT/CN2020/142389, filed on Dec. 31, 2020.

(51) Int. Cl.
 *H01M 4/583* (2010.01)
 *H01M 4/36* (2006.01)
 *H01M 4/58* (2010.01)
 *H01M 4/62* (2006.01)
 *H01M 10/0525* (2010.01)
 *H01M 4/02* (2006.01)

(52) U.S. Cl.
 CPC ......... *H01M 4/366* (2013.01); *H01M 4/5825* (2013.01); *H01M 4/583* (2013.01); *H01M 4/622* (2013.01); *H01M 10/0525* (2013.01); *H01M 2004/021* (2013.01); *H01M 2004/027* (2013.01); *H01M 2004/028* (2013.01)

(58) Field of Classification Search
 None
 See application file for complete search history.

(56) References Cited

FOREIGN PATENT DOCUMENTS

| CN | 108352531 A | 7/2018 |
|---|---|---|
| CN | 109004170 A | 12/2018 |
| CN | 109004171 A | 12/2018 |
| CN | 109461882 A | 3/2019 |

(Continued)

OTHER PUBLICATIONS

International Search Report issued on Sep. 24, 2021 in corresponding application No. PCT/CN2020/142389; 6 pgs.

(Continued)

*Primary Examiner* — Carlos Barcena
(74) *Attorney, Agent, or Firm* — Maier & Maier, PLLC (57) ABSTRACT

An electrode plate includes a current collector and an active material layer provided on the current collector. The active material layer includes a first composite particle including a first active material particle and a first binder particle and a second composite particle including a second active material particle and a second binder particle. In a thickness direction of the active material layer, the first composite particle is closer to the current collector than the second composite particle. A quantity of the first active material particle contained in the first composite particle is greater than a quantity of the second active material particle contained in the second composite particle. Components of both the first binder particle and the second binder particle include polypropylene.

19 Claims, 3 Drawing Sheets

(56) References Cited

FOREIGN PATENT DOCUMENTS

EP          1972017 A1    9/2008
JP       2013062105 A    4/2013

OTHER PUBLICATIONS

Chinese Office Action issued on Apr. 22, 2022 in corresponding application No. 202080027734.2; 14 pgs.
Chinese Notification to Grant a Patent on Sep. 8, 2022 in corresponding application No. 202080027734.2; 6 pgs.

ELECTRODE PLATE, ELECTROCHEMICAL APPARATUS, AND ELECTRONIC APPARATUS

CROSS-REFERENCE TO RELATED APPLICATION

The present application is a continuation application of PCT Application Serial No. PCT/CN2020/142389, filed on Dec. 31, 2020, the content of which is incorporated by reference in its entirety.

TECHNICAL FIELD

This application relates to the field of electrochemical energy storage, and in particular, to an electrode plate, an electrochemical apparatus, and an electronic apparatus.

BACKGROUND

As electrochemical apparatuses (for example, lithium-ion batteries) develop and advance, increasingly higher requirements are imposed on energy density and safety performance of the electrochemical apparatuses. Although current technologies used to improve the electrochemical apparatuses are capable of improving the energy density and safety performance of the electrochemical apparatuses to some extent, these technologies are still unsatisfactory and are expected to be further improved.

SUMMARY

An embodiment of this application provides an electrode plate, where the electrode plate includes a current collector and an active material layer provided on the current collector. In some embodiments, the active material layer includes a first composite particle and a second composite particle. The first composite particle includes a first active material particle and a first binder particle, where the first binder particle and the first active material particle that are in contact with the first binder particle form the first composite particle. The second composite particle includes a second active material particle and a second binder particle, where the second binder particle and the second active material particle that are in contact with the second binder particle form the second composite particle. In a thickness direction of the active material layer, the first composite particle is closer to the current collector than the second composite particle. A quantity of the first active material particle contained in the first composite particle is greater than a quantity of the second active material particle contained in the second composite particle. Components of both the first binder particle and the second binder particle include polypropylene.

In some embodiments, the active material layer includes a first active material layer and a second active material layer, the first active material layer includes the first composite particle, and the second active material layer includes the second composite particle.

In some embodiments, a particle size of the first binder particle ranges from 0.06 μm to 6 μm, and a particle size of the second binder particle ranges from 0.05 μm to 5 μm.

In some embodiments, the particle size of the first binder particle is greater than the particle size of the second binder particle.

In some embodiments, the active material layer further includes a third binder, and the third binder includes at least one of polyacrylate, polyacrylic acid, polyacrylate, polymethyl methacrylate, polyacrylonitrile, polyamide, or carboxymethylcellulose sodium.

In some embodiments, a particle size of the first active material particle ranges from 0.1 μm to 2.3 μm, and a particle size of the second active material particle ranges from 2.31 μm to 30 μm.

In some embodiments, a mass percentage of the first binder particle in the first active material layer to the first active material layer is A, and a mass percentage of the second binder particle in the second active material layer to the second active material layer is B, where A>B.

In some embodiments, on a cross section in a thickness direction of the electrode plate, a quantity of the first binder particle in the first active material layer per unit area is greater than a quantity of the second binder particle in the second active material layer per unit area.

In some embodiments, a ratio of A to B is 1.5 to 6.

In some embodiments, the electrode plate is a positive electrode plate, and the first active material particle and the second active material particle are each independently selected from at least one of lithium cobalt oxide, lithium iron phosphate, lithium manganese iron phosphate, sodium iron phosphate, lithium vanadium phosphate, sodium vanadium phosphate, lithium vanadyl phosphate, sodium vanadyl phosphate, lithium vanadate, lithium manganate oxide, lithium nicotinate, lithium nickel cobalt manganate, lithium-rich manganese-based material, or lithium nickel cobalt aluminate.

In some embodiments, the electrode plate is a negative electrode plate, and the first active material particle and the second active material particle are each independently selected from at least one of artificial graphite, natural graphite, mesocarbon microbead, soft carbon, hard carbon, silicon, tin, silicon carbon, silicon oxygen, or lithium titanate.

Another embodiment of this application provides an electrochemical apparatus. The electrochemical apparatus includes a positive electrode plate, a negative electrode plate, and a separator provided between the positive electrode plate and the negative electrode plate, where at least one of the positive electrode plate and the negative electrode plate is the foregoing electrode plate.

An embodiment of this application further provides an electronic apparatus, including the foregoing electrochemical apparatus.

Components of both the first binder particle and the second binder particle include polypropylene, which improves binding of the first active material particle and the second active material particle to the current collector. In addition, polypropylene is a soft glue, and the use of polypropylene in the active material layer can also reduce an adverse effect on compacted density of the active material layer.

DETAILED DESCRIPTION

The following embodiments may enable those skilled in the art to understand this application more comprehensively, but do not limit this application in any way.

Figure 1:
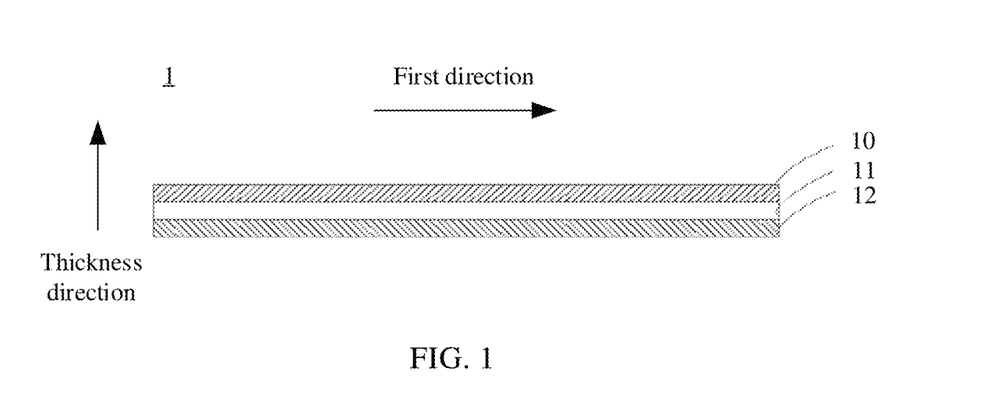
FIG. 1 is a schematic diagram of an electrode assembly of an electrochemical apparatus according to an embodiment of this application.

FIG. 1 is a cross-sectional view of an electrode assembly of an electrochemical apparatus according to an embodiment of this application. It should be understood that when the electrode assembly is a wound structure, FIG. 1 is an expanded cross-sectional view of the electrode assembly along a first direction. In some embodiments, the first direction is perpendicular to a winding direction. The electrochemical apparatus may include an electrode assembly 1, and the electrode assembly 1 may include a positive electrode plate 10, a negative electrode plate 12, and a separator 11 disposed between the positive electrode plate 10 and the negative electrode plate 12.

Figure 2:
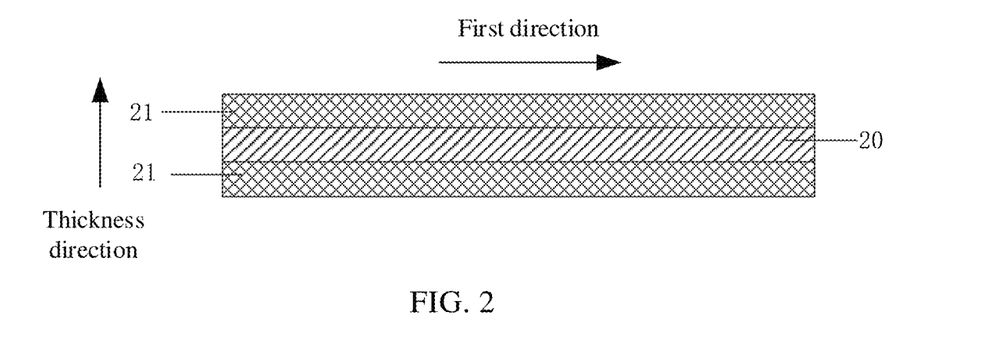
FIG. 2 is a cross-sectional view of electrode plates according to some embodiments of this application.

As shown in FIG. 2, an embodiment of this application provides an electrode plate. The electrode plate includes a current collector 20 and an active material layer 21 provided on the current collector 20. It should be understood that although FIG. 2 shows that active material layers 21 are provided on two sides of the current collector 20, this is only exemplary and is not intended to limit this application. The active material layer 21 may be provided on only one side of the current collector 20. Although FIG. 2 shows that the current collector 20 and the active material layers 21 are in direct contact, in some embodiments, an additional layer may be provided between the current collector 20 and the active material layer 21.

Figure 3:
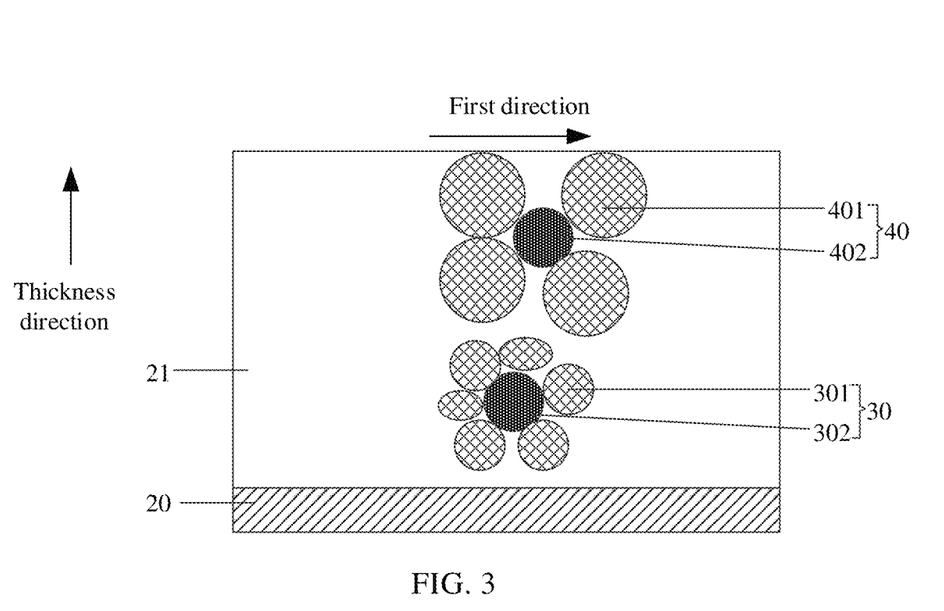
FIG. 3 is a cross-sectional view of an electrode plate according to some embodiments of this application.

As shown in FIG. 3, in some embodiments of this application, the active material layer 21 includes a first composite particle 30 and a second composite particle 40. The first composite particle 30 includes a first active material particle 301 and a first binder particle 302, where the first binder particle 302 and the first active material particle 301 that are in contact with the first binder particle 302 form the first composite particle 30. The second composite particle 40 includes a second active material particle 401 and a second binder particle 402, where the second binder particle 402 and the second active material particle 401 that are in contact with the second binder particle 402 form the second composite particle 40.

It should be understood that for simplicity, only one first active material particle 301 and one second binder particle 402 are shown in FIG. 3. In addition, although FIG. 3 shows only one first composite particle 30 and one second composite particle 40, this is only exemplary and is not intended to limit this application. The active material layer 21 may further include other first composite particles 30 and second composite particles 40 that are not shown. Further, in the active material layer 21, there may be a first active material particle 301 and/or a first binder particle 302 that do/does not form the first composite particle 30, and there may be a second active material particle 401 and/or a second binder particle 402 that do/does not form the second composite particle 40.

In some embodiments, in a thickness direction of the active material layer 21, the first composite particle 30 is closer to the current collector 20 than the second composite particle 40, where a quantity of the first active material particle 301 contained in the first composite particle 30 is greater than a quantity of the second active material particle 401 contained in the second composite particle 40. It should be understood that FIG. 3 is only exemplary and shows the active material layer 21 provided on one side of the current collector 20 for ease of description of the embodiments. A quantity of active material layers 21, and a shape and size of a particle are not intended to limit this application.

In some embodiments, a quantity of particles in this application may be determined in the following steps: Cut an electrode plate to obtain a cross section in a thickness direction of the electrode plate, then use a scanning electronic microscope (SEM) to scan the cross section in the thickness direction of the electrode plate, and obtain a corresponding quantity of particles shown in the cross section.

Figure 5:
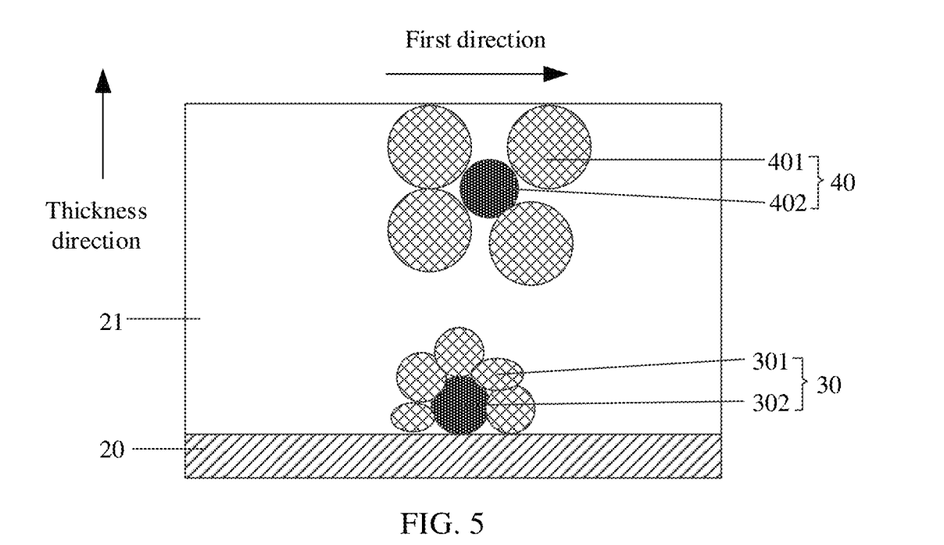
FIG. 5 is a cross-sectional view of an electrode plate according to some embodiments of this application.

In some embodiments, components of both the first binder particle 302 and the second binder particle 402 include polypropylene. Generally, to increase a binding force between the active material layer 21 and the current collector 20, an amount of binders is increased or a binder with a strong binding force is used. However, an increase in the amount of binders leads to a limited increase in the binding force, reduces an amount of active materials, and reduces energy density. Currently, some binders with a strong binding force have high hardness, and the active material also has high hardness itself. If compacted density is increased during cold pressing of the electrode plate, the electrode plate is prone to brittle breaking. Therefore, cold pressing density of the electrode plate is limited, and energy density is reduced. In this application, components of both the first binder particle 302 and the second binder particle 402 include polypropylene. Polypropylene is capable of binding active material particles closely together. In addition, as shown in FIG. 5, when a local surface of a polypropylene particle is in contact with the current collector 20, the polypropylene particle can be well bound to the current collector 20, thereby improving binding between the active material layer 21 and the current collector 20. Besides, polypropylene has low hardness, which reduces an adverse effect of using a binder with high hardness on compacted density of the electrode plate.

Figure 4:
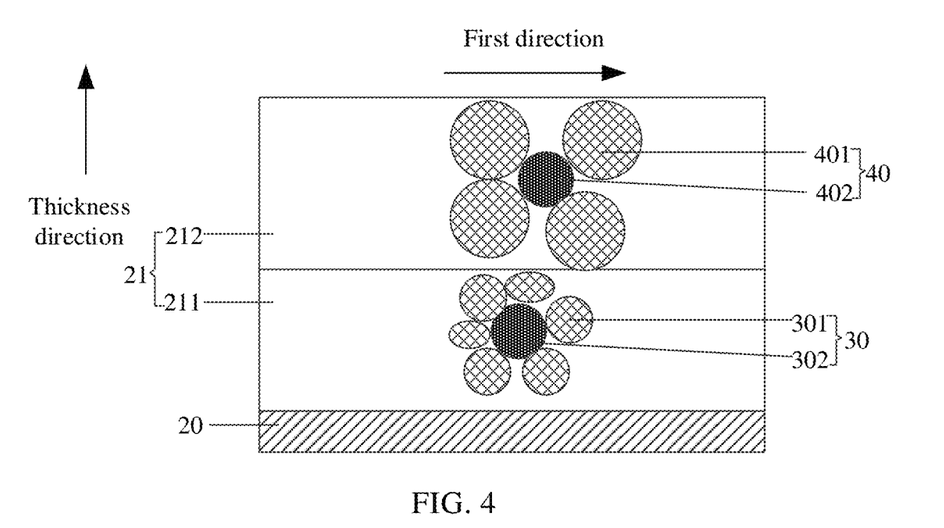
FIG. 4 is a cross-sectional view of an electrode plate according to some embodiments of this application.
Figure 6:
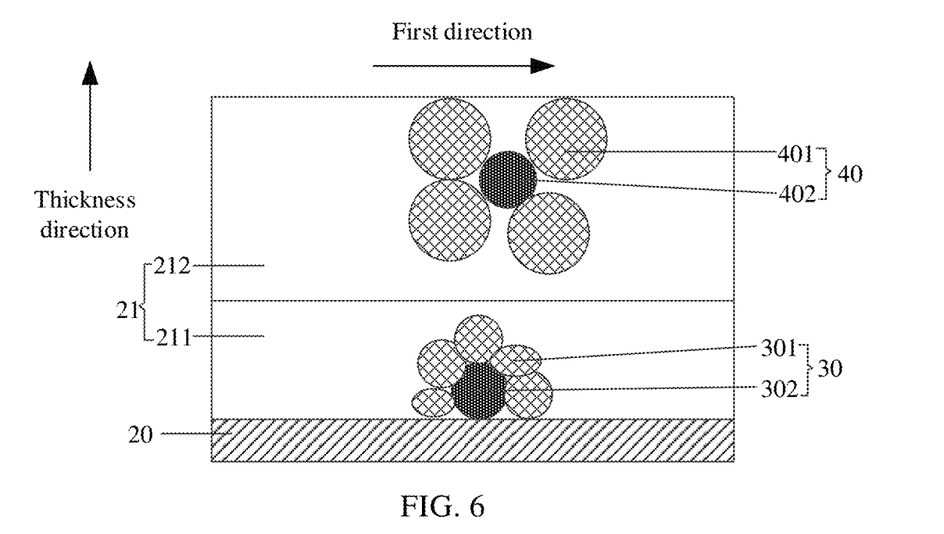
FIG. 6 is a cross-sectional view of an electrode plate according to some embodiments of this application.

As shown in FIG. 4 and FIG. 6, in some embodiments, the active material layer 21 includes a first active material layer 211 and a second active material layer 212, the first active material layer 211 includes the first composite particle 30, and the second active material layer 212 includes the second composite particle 40. Therefore, the first composite particle 30 and the second composite particle 40 may be disposed in the same layer or may be respectively disposed in different layers, as long as the first composite particle 30 is closer to the current collector and the second composite particle 40 is farther away from the current collector.

In some embodiments, a particle size of the first binder particle 302 ranges from 0.06 μm to 6 μm. If the a particle size of the first binder particle 302 is too small, the first binder particle 302 itself is prone to aggregation and binding and cannot be fully bound to the first active material particle 301, which causes the binder particle to gather in a local zone and affects a binding effect. If the particle size of the first binder particle 302 is too large, a gap between the first active material particle 301 cannot be effectively filled, reducing energy density of the electrode plate.

It should be noted that the particle size range of the first binder particle 302 refers to a particle size of the first binder particle 302 in a single first composite particle 30. When there are a plurality of first composite particles 30 in the electrode plate, particle sizes of the first binder particles 302 in all the first composite particles 30 may be in the range of 0.06 μm to 6 μm, or particle sizes of the first binder particles 302 in some first composite particles 30 are in the range of 0.06 μm to 6 μm.

In some embodiments, a particle size of a particle (for example, a first active material particle, a second active material particle, a first binder particle, or a second binder particle) in this application may be determined by using the following method: Obtain a cross-sectional area of the particle, and take a diameter of a circle that has the same area as the cross-sectional area as the particle size of the particle. A method for obtaining the cross-sectional area of the particle may be cutting the electrode plate to obtain a cross section in a thickness direction of the electrode plate, then using a scanning electronic microscope (SEM) to scan a cross section of a particle in the thickness direction of the electrode plate, and determining the cross-sectional area of the particle. A test procedure is as follows:

Sampling: An electrochemical apparatus (for example, a lithium-ion battery) was disassembled, an electrode plate was taken out and soaked in a dimethyl carbonate (DMC) solution for 6 h to remove residual electrolytes, and finally the electrode plate was dried by using a drying oven.

Sample preparation: The dried electrode plate was cut to obtain a to-be-tested section, that is, a cross section of an active material layer in a thickness direction. The test sample was adhered to paraffin wax by using a heating plate, the to-be-tested section was polished by using an ion polisher IB-195020 CCP, and an SEM test sample was obtained after a surface became smooth.

Testing: A micro structure of the active material layer in the thickness direction was observed by using a scanning electronic microscope JEOL6390.

It should be understood that this is only exemplary and another appropriate method may be used.

In some embodiments, a particle size of the second binder particle 402 ranges from 0.05 μm to 5 μm. If the particle size of the second binder particle 402 is too small, the second binder particle 402 itself is prone to aggregation and binding and cannot be fully bound to the second active material particle 401, which causes the binder particle to gather in a local zone and affects a binding effect. If the particle size of the second binder particle 402 is too large, a gap between the second active material particle 401 cannot be effectively filled, reducing energy density of the electrode plate.

It should be noted that the particle size range of the second binder particle 402 refers to a particle size of the second binder particle 402 in a single second composite particle 40. When there are a plurality of second composite particles 40 in the electrode plate, particle sizes of the second binder particles 402 in all the second composite particles 40 may be in the range of 0.05 μm to 5 μm, or particle sizes of the second binder particles 402 in some second composite particles 40 are in the range of 0.05 μm to 5 μm.

In some embodiments, the particle size of the first binder particle 302 is greater than the particle size of the second binder particle 402. In this way, the first binder particle 302 that is close to the current collector 20 is capable of binding more first active material particles 301, which improves a binding force between the active material particle in a zone close to the current collector, thereby improving a strength of binding between the first active material particle 301 and the current collector 20.

In some embodiments, the active material layer 21 further includes a third binder, and the third binder includes at least one of polyacrylate, polyacrylic acid, polyacrylate, polymethyl methacrylate, polyacrylonitrile, polyamide, or carboxymethylcellulose sodium. In some embodiments, the third binder is a binder with a strong binding force and can further improve the strength of binding between the active material layer 21 and the current collector 20. In some embodiments, a mass ratio of polypropylene to the third binder in the active material layer 21 is 1:10 to 10:0.1.

In some embodiments, a particle size of the first active material particle 301 ranges from 0.1 μm to 2.3 μm. If the particle size of the first active material particle 301 is too small, a specific surface area of the first active material particle 301 is excessively large, which increases side reactions with the electrolyte, adversely affecting cycling performance of the electrochemical apparatus. If the particle size of the first active material particle 301 is too large, the rate performance of the electrochemical apparatus is adversely affected.

It should be noted that the particle size range of the first active material particle 301 refers to a particle size of the first active material particle 301 in a single first composite particle 30. When there are a plurality of first composite particles 30 in the electrode plate, a particle size of the first active material particles 301 in all the first composite particles 30 may be in the range of 0.1 μm to 2.3 μm, or particle sizes of the first active material particles 301 in some first composite particles 30 are in the range of 0.1 μm to 2.3 μm.

In some embodiments, particle sizes of the second active material particle 401 ranges from 2.31 μm to 30 μm. If the particle size of the second active material particle 401 are too small, a specific surface area of the second active material particle 401 is excessively large, which increases side reactions with the electrolyte, adversely affecting the cycling performance of the electrochemical apparatus. If the particle size of the second active material particle 401 is too large, the rate performance of the electrochemical apparatus is adversely affected.

It should be noted that the particle size range of the second active material particle 401 refers to a particle size of the second active material particle 401 in a single second composite particle 40. When there are a plurality of second composite particles 40 in the electrode plate, particle sizes of the second active material particles 401 in all the second composite particles 40 may be in the range of 2.31 μm to 30 μm, or particle sizes of the second active material particles 401 in some second composite particles 40 are in the range of 2.31 μm to 30 μm.

In some embodiments, a mass percentage of the first binder particle 302 in the first active material layer 211 to the first active material layer 211 is A, and a mass percentage of the second binder particle 402 in the second active material layer 212 to the second active material layer 212 is B, where A>B. An interface between the first active material layer 211 and the current collector 20 is a fragile position where peeling or detachment easily occurs. By making the mass percentage of the first binder particle 302 in the first active material layer 211 that is closer to the current collector 20 greater than the mass percentage of the second binder particle 402 in the second active material layer 212 that is farther away from the current collector 20, the strength of binding between the first active material layer 211 and the current collector 20 is improved, and a risk of peeling of the first active material layer 211 from the current collector 20 is reduced. In addition, the mass percentage of the second binder particle 402 in the second active material layer 212 that is farther away from the current collector 20 is smaller, so that more active materials can be accommodated, thereby improving the energy density of the electrochemical apparatus.

In some embodiments, a ratio of A to B is 1.5 to 6. If the ratio of A to B is too small, an effect of improving the strength of binding between the first active material layer 211 and the current collector 20 is relatively poor. However, if the ratio of A to B is too large, the energy density of the electrochemical apparatus is decreased even though the strength of binding between the first active material layer 211 and the current collector 20 can be further improved.

In some embodiments, on a cross section in a thickness direction of the electrode plate, a quantity of the first binder particle 302 in the first active material layer 211 per unit area is greater than a quantity of the second binder particle 402 in the second active material layer 212 per unit area. In this way, the quantity of the first binder particle 302 in the first active material layer 211 that are closer to the current collector 20 can be increased, thereby improving the strength of binding between the first active material layer 211 and the current collector 20 and reducing the risk of peeling of the first active material layer 211 from the current collector 20. In addition, the quantity of the second binder particle 402 in the second active material layer 212 is smaller, which can increase the quantity of the second active material particle 401 in the second active material layer 212, thereby improving the energy density of the electrochemical apparatus.

In some embodiments, a scanning electronic microscope (SEM) technology may be used to observe and test a micro structure of the active material layer in the thickness direction, so as to learn about distribution of the quantity of the first binder the particle 302 in the first active material layer 211 and the quantity of the of the second binder particle 402 in the second active material layer 212.

In some embodiments, at least one of the positive electrode plate 10 and the negative electrode plate 12 may use the foregoing electrode plate. When the electrode plate is the positive electrode plate 10, the particles 301 of the first active material and the particles 401 of the second active material are each independently selected from at least one of lithium cobalt oxide, lithium iron phosphate, lithium manganese iron phosphate, sodium iron phosphate, lithium vanadium phosphate, sodium vanadium phosphate, lithium vanadyl phosphate, sodium vanadyl phosphate, lithium vanadate, lithium manganate oxide, lithium nicotinate, lithium nickel cobalt manganate, lithium-rich manganese-based material, or lithium nickel cobalt aluminate. When the electrode plate is the negative electrode plate 12, the particles 301 of the first active material and the particles 401 of the second active material are each independently selected from at least one of artificial graphite, natural graphite, mesocarbon microbead, soft carbon, hard carbon, silicon, tin, silicon carbon, silicon oxygen, or lithium titanate.

As described above, the electrochemical apparatus is provided. The electrochemical apparatus includes the electrode assembly 1, and the electrode assembly 1 includes the positive electrode plate 10, the negative electrode plate 12, and the separator 11 disposed between the positive electrode plate 10 and the negative electrode plate 12. At least one of the positive electrode plate 10 and the negative electrode plate 12 is any one of the foregoing electrode plates.

In some embodiments, a current collector of the negative electrode plate 12 may use at least one of copper foil, nickel foil, or carbon-based current collectors. In some embodiments, compacted density of an active material layer of the negative electrode plate 12 may be 1.0 g/cm$^3$ to 1.9 g/cm$^3$.

If the compacted density of the active material layer is too low, volumetric energy density of the electrochemical apparatus is compromised. If the compacted density of the active material layer is too high, it is not conducive to passage of lithium ions, which increases polarization and affects electrochemical performance. In addition, lithium precipitation easily occurs during charging of the electrochemical apparatus. In some embodiments, the active material layer may further include a conductive agent. The conductive agent in the active material layer may include at least one of conductive carbon black, Ketjen black, laminated graphite, graphene, carbon nanotubes, or carbon fiber.

In some embodiments, a mass ratio of a negative active material particle (for example, a silicon-based material particle and a carbon material particle) to the conductive agent to binders (including the first binder particle and the second binder particle) in the active material layer may be (70 to 98):(1 to 15):(1 to 15). It should be understood that the foregoing description is only exemplary. Any other appropriate materials and mass ratios may be used.

In some embodiments, the positive electrode plate 10 includes a positive electrode current collector and an active material layer provided on the positive electrode current collector. The active material layer is provided on one side or two sides of the positive electrode current collector. In some embodiments, the positive electrode current collector may use Al foil, or may use another positive electrode current collector commonly used in the art. In some embodiments, a thickness of the positive electrode current collector may be 1 μm to 200 μm. In some embodiments, the active material layer may be coated only in a local zone of the positive electrode current collector. In some embodiments, a thickness of the active material layer may be 10 μm to 500 μm.

In some embodiments, the active material layer may further include a conductive agent. In some embodiments, the conductive agent in the active material layer may include at least one of conductive carbon black, Ketjen black, laminated graphite, graphene, carbon nanotubes, or carbon fiber. In some embodiments, a mass ratio of an active material to a conductive agent to binders in the active material layer may be (70 to 98):(1 to 15):(1 to 15). It should be understood that the foregoing description is only exemplary. The active material layer of the positive electrode plate 10 may use any other appropriate materials, thicknesses, and mass ratios.

In some embodiments, the separator 11 includes at least one of polyethylene, polypropylene, polyvinylidene fluoride, polyethylene terephthalate, polyimide, or aramid. For example, polyethylene includes at least one of high-density polyethylene, low-density polyethylene, or ultra-high-molecular-weight polyethylene. Particularly, polyethylene and polypropylene have a good effect on preventing short circuits, and can improve the stability of a battery through a shutdown effect. In some embodiments, a thickness of the separator ranges from about 5 μm to 500 μm.

In some embodiments, a surface of the separator may further include a porous layer. The porous layer is disposed on at least one surface of a substrate of the separator and includes inorganic particles and a binder, where the inorganic particles are selected from at least one of aluminum oxide ($Al_2O_3$), silicon oxide ($SiO_2$), magnesium oxide (MgO), titanium oxide ($TiO_2$), hafnium oxide ($HfO_2$), stannic oxide ($SnO_2$), cerium dioxide ($CeO_2$), nickel oxide (NiO), zinc oxide (ZnO), calcium oxide (CaO), zirconium oxide ($ZrO_2$), yttrium oxide ($Y_2O_3$), silicon carbide (SiC), boehmite, aluminum hydroxide, magnesium hydroxide, calcium hydroxide, or barium sulfate. In some embodiments, diameters of pores of the separator range from about 0.01 µm to 1 µm. The binder of the porous layer is selected from at least one of polyvinylidene fluoride, a vinylidene fluoride-hexafluoropropylene copolymer, polyamide, polyacrylonitrile, polyacrylate, polyacrylic acid, polyacrylate, carboxymethylcellulose sodium, polyvinylpyrrolidone, polyvinyl ether, polymethyl methacrylate, polytetrafluoroethylene, or polyhexafluoropropylene. The porous layer on the surface of the separator can improve heat resistance and oxidation resistance of the separator, and electrolyte infiltration performance, and enhance cohesiveness between the separator and the electrode plate.

In some embodiments of this application, the electrode assembly of the electrochemical apparatus is a wound electrode assembly, a stacked electrode assembly, or a folded electrode assembly.

In some embodiments, the electrochemical apparatus includes a lithium-ion battery. However, this application is not limited thereto. In some embodiments, the electrochemical apparatus may further include an electrolyte. The electrolyte may be one or more of a gel electrolyte, a solid electrolyte, and a liquid electrolyte. The liquid electrolyte includes a lithium salt and a non-aqueous solvent. The lithium salt is selected from one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, or lithium difluoro borate. For example, $LiPF_6$ is selected as the lithium salt because it provides a high ionic conductivity and can improve the cycling performance.

The non-aqueous solvent may be a carbonate compound, a carboxylate compound, an ether compound, another organic solvent, or a combination thereof.

The carbonate compound may be a linear carbonate compound, a cyclic carbonate compound, a fluorocarbonate compound, or a combination thereof.

Examples of the linear carbonate compound are diethyl carbonate (DEC), dimethyl carbonate (DMC), dipropyl carbonate (DPC), methyl propyl carbonate (MPC), ethylene propyl carbonate (EPC), ethyl methyl carbonate (MEC), and a combination thereof. Examples of the cyclic carbonate compound are ethylene carbonate (EC), propylene carbonate (PC), butylene carbonate (BC), vinyl ethylene carbonate (VEC), or a combination thereof. Examples of the fluorocarbonate compound are fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate, or a combination thereof.

Examples of the carboxylate compound are methyl acetate, ethyl acetate, n-propyl acetate, tert-butyl acetate, methyl propionate, ethyl propionate, propyl propionate, γ-butyrolactone ester, caprolactone, valerolactone, mevalonolactone, caprolactone, methyl formate, or a combination thereof.

Examples of the ether compound are dibutyl ether, tetraglyme, diglyme, 1,2-dimethoxyethane, 1,2-diethoxyethane, ethoxymethoxyethane, 2-methyltetrahydrofuran, tetrahydrofuran, or a combination thereof.

An example of the another organic solvent is dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate ester, or a combination thereof.

In some embodiments of this application, a lithium-ion battery is used as an example. A positive electrode plate, a separator, and a negative electrode plate are wound or stacked in sequence to form an electrode assembly, and the electrode assembly is then packaged in an aluminum-plastic film, followed by injection of an electrolyte, formation, and packaging, so that the lithium-ion battery is prepared. Then, a performance test is performed on the prepared lithium-ion battery.

Those skilled in the art will understand that the method for preparing the electrochemical apparatus (for example, the lithium-ion battery) described above is only an embodiment. Without departing from the content disclosed in this application, other methods commonly used in the art may be used.

An embodiment of this application further provides an electronic apparatus, including the foregoing electrochemical apparatus. The electronic apparatus according to this embodiment of this application is not particularly limited, and may be any known electronic apparatus used in the prior art. In some embodiments, the electronic apparatus may include, but is not limited to: a notebook computer, a pen-input computer, a mobile computer, an e-book player, a portable phone, a portable fax machine, a portable copier, a portable printer, a head-mounted stereo headset, a video recorder, a liquid crystal display television, a portable cleaner, a portable CD player, a mini disc, a transceiver, an electronic notebook, a calculator, a memory card, a portable recorder, a radio, a backup power supply, a motor, an automobiles, a motorcycle an assisted bicycle, bicycle, a lighting apparatus, a toy, a game machine, a clock, an electric tool, a flashlight, a camera, a large household storage battery, or a lithium-ion capacitor.

Some specific examples and comparative examples are listed below to better illustrate this application. Lithium-ion batteries are used as examples. For easy illustration, polypropylene is used in an active material layer of a positive electrode plate 10. Based on this, it can be learned that when such a structure is used in an active material layer of a negative electrode plate 12, a same effect can be obtained as that obtained when polypropylene is used in the active material layer of the positive electrode plate 10.

Example 1

Preparation of a positive electrode plate: First positive electrode active material particles lithium cobalt oxide ($LiCoO_2$), a first conductive agent conductive carbon black, first binder particles polypropylene (PP), and sodium polyacrylate were dissolved in an N-methylpyrrolidone (NMP) solution at a weight ratio of 97:1:1.4:0.6 to form a first positive electrode slurry. An aluminum foil was used as a positive electrode current collector. The first positive electrode slurry was applied on the positive electrode current collector in an applying amount of 9.3 mg/cm$^2$, followed by drying to obtain a first active material layer. Second positive electrode active material particles lithium cobalt oxide $LiCoO_2$, a second conductive agent conductive carbon black, second binder particles polypropylene (PP), and sodium polyacrylate were dissolved in an N-methylpyrrolidone (NMP) solution at a weight ratio of 97:1:0.6:1.4 to form a second positive electrode slurry. The second positive electrode slurry was applied on the first active material layer in an applying amount of 9.3 mg/cm$^2$, to obtain a second active material layer. Drying, cold pressing, and cutting were then performed to obtain a positive electrode plate.

A slice in a thickness direction of the prepared positive electrode plate was obtained and an SEM diagram of the slice was obtained. Particle sizes of the first binder particles polypropylene, the second binder particles polypropylene, the first positive electrode active material particles, and the second positive electrode active material particles were measured from the SEM diagram. A particle size of a particle herein refers to a diameter of a circle that has the same area as a cross-sectional area of the particle measured in the SEM diagram. The particle sizes of the first binder particles polypropylene ranged from 0.5 μm to 1 μm, the particle sizes of the second binder particles polypropylene range from 0.5 μm to 1 m, the particle sizes of the first positive electrode active material particles range from 0.5 m to 1 μm, and the particle sizes of the second positive electrode active material particles ranged from 5 μm to 15 μm.

A ratio of a mass percentage of the first binder particles in the first active material layer to a mass percentage of the second binder particles in the second active material layer was 7:3. A total mass percentage of polypropylene particles in a total active material layer (the first active material layer and the second active material layer) was 1%. A total mass percentage of sodium polyacrylate particles in the total active material layer was 1%. On a cross section in the thickness direction of the positive electrode plate, a quantity of the first binder particle in the first active material layer per unit area was greater than a quantity of the second binder particle in the second active material layer per unit area.

Preparation of a negative electrode plate: Graphite, carboxymethylcellulose sodium (CMC), and a binder styrene-butadiene rubber were dissolved at a weight ratio of 97.7:1.3:1 in deionized water to form an active material layer slurry. A 10 μm thick copper foil was used as a negative electrode current collector. The negative electrode slurry was applied on the negative electrode current collector in an applying amount of 9.3 mg/cm², followed by drying and cutting to obtain a negative electrode plate.

Preparation of a separator: 8 μm thick polyethylene (PE) was used as a separator substrate, 2 μm aluminum oxide ceramic layers were applied on two sides of the separator substrate, and finally 2.5 mg polyvinylidene fluoride (PVDF) binders were applied on each side that was coated with the ceramic layer. Drying was then performed.

Preparation of an electrolyte: In an environment with a water content less than 10 ppm, $LiPF_6$ was added to a non-aqueous organic solvent (in which ethylene carbonate (EC), diethyl carbonate (DEC), propylene carbonate (PC), acrylate, and vinylene carbonate (VC) were at a weight ratio of 20:30:20:28:2) with a concentration of $LiPF_6$ being 1.15 mol/L, and well mixed to obtain an electrolyte.

Preparation of a lithium-ion battery: The positive electrode plate, the separator, and the negative electrode plate were stacked in sequence, so that the separator was disposed between the positive electrode plate and the negative electrode plate for separation, and winding was performed to obtain an electrode assembly. The electrode assembly was arranged in an outer packaging aluminum-plastic film, and was dehydrated at a temperature of 80° C. Then the above-mentioned electrolyte was injected and packaging was performed, followed by processes such as formation, degassing, and cutting to obtain the lithium-ion battery.

Examples and comparative examples had parameters changed on a basis of the steps in Example 1. The following tables show the specific parameters changed.

In Examples 2 to 5, a mass percentage of the polypropylene particles and a mass percentage of sodium polyacrylate particles in the total active material layer were different from those in Example 1.

In Comparative Example 1, the first binder and the second binder did not use polypropylene particles or sodium polyacrylate. The first binder and the second binder each used polyvinylidene fluoride with a mass percentage of 2%. In Comparative Example 2, the first binder and the second binder did not use polypropylene particles. The first binder and the second binder each used sodium polyacrylate with a mass percentage of 2%.

In Examples 6 to 8 and Comparative Examples 3 and 4, particle sizes of particles of the first binder polypropylene and particles of the second binder polypropylene were in different ranges from Example 1.

In Examples 9 to 11 and Comparative Example 5, ratios of a mass percentage of the first binder particles polypropylene in the first active material layer to a mass percentage of the second binder particles polypropylene in the second active material layer were different from that in Example 1.

In Examples 12 to 14 and Comparative Examples 6 and 7, particle sizes of the first active material particles lithium cobalt oxide were in a different range from Example 1.

In Examples 15 to 17 and Comparative Example 8, particle sizes of the second active material lithium particles cobalt oxide were in a different range from Example 1.

The following describes methods for testing various parameters in this application.

Method for testing a strength of binding between the first active material layer and the current collector:

The positive electrode plate was taken out from the lithium-ion battery. After the positive electrode plate was spread and air-dried for 1 h, a 30 μmm wide, 150 μmm long test sample was obtained by using a blade. The test sample was fastened to a test clamp of a Gotech tensile machine to test a binding strength. A peeling degree was 90 degrees, a stretching speed was 50 μmm/min, and a stretching displacement was 60 μmm. When an interface between the current collector and the first active material layer was peeled, a measured result was the strength of binding between the first active material layer and the current collector.

Method for Testing Compacted Density (PD):

A cold pressed positive electrode plate was taken. Six positive electrode active material layers and six positive electrode current collectors were punched by using a 1540.25 mm² mould. A total weight Mc (g) of the six positive electrode active material layers and a total weight Mb (g) of the six current collectors were weighed by using an analytical balance (electronic balance FA2004B from Shanghai Jingke Tianmei). An average thickness Dc (mm) of the six positive electrode active material layers and an average thickness Db (mm) of the six current collectors were measured by using a micrometer. PD=(Mc−Mb)/(6×(Dc−db)×1540.25×1000). The unit was g/cm³.

Method for Testing Energy Density:

The lithium-ion battery was placed in a 25° C. thermostat and left to stand for 30 minutes, so that the lithium-ion battery reached a constant temperature. The lithium-ion battery that had reached a constant temperature was charged at a constant current of 0.5 C to a voltage of 4.45 V, then charged at a constant voltage of 4.45 V to a current of 0.05 C, and discharged at 0.5 C to a voltage of 3.0 V. A discharge capacity was recorded. Energy density=Discharge capacity/(Length×width×thickness of the lithium-ion battery).

Table 1 shows various parameters and evaluation results in Examples 1 to 5 and Comparative Examples 1 and 2.

TABLE 1

| | Mass percentage of polypropylene particles in total active material layer | Mass percentage of sodium polyacrylate particles in total active material layer | Particle size range of first binder particles polypropylene and second binder particles polypropylene(μm) | Mass percentage of first binder particles polypropylene:mass percentage of of second binder particles polypropylene | Particle size range of first active material particles lithium cobalt oxide (μm) |
|---|---|---|---|---|---|
| | | | Example | | |
| 1 | 1% | 1% | 0.5 to 1 | 7:3 | 0.5 to 1 |
| 2 | 1.8% | 0.2% | 0.5 to 1 | 7:3 | 0.5 to 1 |
| 3 | 1.5% | 0.5% | 0.5 to 1 | 7:3 | 0.5 to 1 |
| 4 | 0.5% | 15% | 0.5 to 1 | 7:3 | 0.5 to 1 |
| 5 | 0.2% | 1.8% | 0.5 to 1 | 7:3 | 0.5 to 1 |
| | | | Comparative Example | | |
| 1 | | 2% polyvinylidene fluoride (PVDF) | \ | \ | 0.5 to 1 |
| 2 | \ | 2% | \ | \ | 0.5 to 1 |

| | Particle size range of second active material particles lithium cobalt oxide (μm) | Strength of binding between first active material layer and current collector (N/m) | Compacted density of positive electrode plate (g/cm$^3$) | Energy density of electrochemical apparatus (Wh/L) |
|---|---|---|---|---|
| | | Example | | |
| 1 | 5 to 15 | 150 | 4.00 | 707 |
| 2 | 5 to 15 | 105 | 4.02 | 708 |
| 3 | 5 to 15 | 144 | 4.10 | 712 |
| 4 | 5 to 15 | 69 | 4.05 | 711 |
| 5 | 5 to 15 | 130 | 3.70 | 687 |
| | | Comparative Example | | |
| 1 | 5 to 15 | 30 | 4.10 | 714 |
| 2 | 5 to 15 | 170 | 2.90 | 627 |

It can be learned from comparison between Examples 1 to 5 and Comparative Examples 1 and 2 that when a binder in the first active material layer was polyvinylidene fluoride (PVDF) particles, a strength of binding between the first active material layer and the current collector was weak. If the binder was replaced with sodium polyacrylate with a strong binding force, the strength of binding between the first active material layer and the current collector was significantly increased. However, compacted density was significantly reduced, thereby leading to a serious decrease in energy density of the electrochemical apparatus. If the polypropylene (PP) particles were mixed with sodium polyacrylate, the strength of binding between the first active material layer and the current collector was increased while the energy density of the electrochemical apparatus was not significantly compromised. In addition, a higher mass percentage of polypropylene particles in the binder resulted in a more significant improvement of the compacted density and energy density.

Table 2 shows various parameters and evaluation results in Examples 1 and 6 to 8 and Comparative Examples 3 and 4.

TABLE 2

| | Particle size range of first binder particles polypropylene and second binder particles polypropylene (μm) | Mass percentage of first binder particles polypropylene:mass percentage of second binder particles polypropylene | Particle size range of first active material particles lithium cobalt oxide (μm) | Particle size range of second active material particles lithium cobalt oxide (μm) | Strength of binding between first active material layer and current collector (N/m) | Compacted density of positive electrode plate (g/cm$^3$) | Energy density of electrochemical apparatus (Wh/L) |
|---|---|---|---|---|---|---|---|
| | | | Example | | | | |
| 1 | 0.5 to 1 | 7:3 | 0.5 to 1 | 5 to 15 | 150 | 4.00 | 707 |
| 6 | 0.1 to 0.6 | 7:3 | 0.5 to 1 | 5 to 15 | 104 | 4.00 | 706 |
| 7 | 0.8 to 1.5 | 7:3 | 0.5 to 1 | 5 to 15 | 137 | 4.00 | 706 |
| 8 | 1.2 to 2 | 7:3 | 0.5 to 1 | 5 to 15 | 110 | 4.00 | 706 |

TABLE 2-continued

|  | Particle size range of first binder particles polypropylene and second binder particles polypropylene (μm) | Mass percentage of first binder particles polypropylene:mass percentage of second binder particles polypropylene | Particle size range of first active material particles lithium cobalt oxide (μm) | Particle size range of second active material particles lithium cobalt oxide (μm) | Strength of binding between first active material layer and current collector (N/m) | Compacted density of positive electrode plate (g/cm³) | Energy density of electrochemical apparatus (Wh/L) |
|---|---|---|---|---|---|---|---|
| | | | Comparative Example | | | | |
| 3 | 0.02 to 0.05 | 7:3 | 0.5 to 1 | 5 to 15 | 88 | 4.00 | 706 |
| 4 | 6.5 to 7.6 | 7:3 | 0.5 to 1 | 5 to 15 | 103 | 3.91 | 689 |

It can be learned from comparison between Examples 1 and 6 to 8 and Comparative Examples 3 and 4 that when particle sizes of polypropylene particles were less than 0.06 μm, the polypropylene particles themselves were prone to aggregation and could not fully participate in binding particles of an active material. In addition, the polypropylene particles might agglomerate, which increased a difficulty of even scattering of the polypropylene particles, and consequently the particles of the active material could not be evenly bound. Therefore, the strength of binding between the first active material layer and the current collector was significantly decreased. When the particle sizes of the polypropylene particles were greater than 6 μm, the particles were too large in particle size and were unable to effectively fill pores between the particles of the active material. In addition, pores were generated between the polypropylene particles and the particles of the active material. As a result, an effective binding area was reduced, the strength of binding between the first active material layer and the current collector was decreased, and the energy density of the electrochemical apparatus was decreased.

Table 3 shows various parameters and evaluation results in Examples 1 and 9 to 11 and Comparative Example 5.

It can be learned from comparison between Examples 1 and 9 to 11 and Comparative Example 5 that when a ratio of a mass percentage of the first binder particles polypropylene that were closer to the current collector in the first active material layer to a mass percentage of the second binder particles polypropylene that were farther away from the current collector in the second active material layer was higher, the strength of binding between the first active material layer and the current collector was higher. As the ratio increased, the mass percentage of the second binder particles polypropylene that were farther away from the current collector in the second active material layer decreased. As a result, lithium ions were easier to deintercalate during charging and discharging of the active material, a capacity efficiency was higher, and the energy density of the electrochemical apparatus also slightly increased. However, if the ratio was too small (that is, the mass percentage of the first binder particles polypropylene that were closer to the current collector in the first active material layer was too small), there was a risk of peeling of the first active material layer. Therefore, this ratio was preferably 7:3 to 3:2.

Table 4 shows various parameters and evaluation results in Examples 1 and 12 to 14 and Comparative Examples 6 and 7.

TABLE 3

|  | Particle size range of first binder particles polypropylene and second binder particles polypropylene (μm) | Mass percentage of first binder particles polypropylene:mass percentage of second binder particles polypropylene | Particle size range of first active material particles lithium cobalt oxide (μm) | Particle size range of second active material particles lithium cobalt oxide (μm) | Strength of binding between first active material layer and current collector (N/m) | Compacted density of positive electrode plate (g/cm³) | Energy density of electrochemical apparatus (Wh/L) |
|---|---|---|---|---|---|---|---|
| | | | Example | | | | |
| 1 | 0.5 to 1 | 7:3 | 0.5 to 1 | 5 to 15 | 150 | 4.00 | 707 |
| 9 | 0.5 to 1 | 9:1 | 0.5 to 1 | 5 to 15 | 201 | 4.00 | 708 |
| 10 | 0.5 to 1 | 4:1 | 0.5 to 1 | 5 to 15 | 177 | 4.00 | 707 |
| 11 | 0.5 to 1 | 3:2 | 0.5 to 1 | 5 to 15 | 140 | 4.00 | 706.5 |
| | | | Comparative Example | | | | |
| 5 | 0.5 to 1 | 1:1 | 0.5 to 1 | 5 to 15 | 122 | 4.00 | 706 |

TABLE 4

| Particle size range of first binder particles polypropylene and second binder particles polypropylene (μm) | Mass percentage of first binder particles polypropylene:mass percentage of second binder particles polypropylene | Particle size range of first active material particles lithium cobalt oxide (μm) | Particle size range of second active material particles lithium cobalt oxide (μm) | Strength of binding between first active material layer and current collector (N/m) | Compacted density of positive electrode plate (g/cm$^3$) | Energy density of electrochemical apparatus (Wh/L) |
|---|---|---|---|---|---|---|
| Example | | | | | | |
| 1  0.5 to 1 | 7:3 | 0.5 to 1 | 5 to 15 | 150 | 4.00 | 707 |
| 12 0.5 to 1 | 7:3 | 0.1 to 0.6 | 5 to 15 | 134 | 4.00 | 706 |
| 13 0.5 to 1 | 7:3 | 0.8 to 1.5 | 5 to 15 | 151 | 4.00 | 706 |
| 14 0.5 to 1 | 7:3 | 1.2 to 2.3 | 5 to 15 | 153 | 4.00 | 706 |
| Comparative Example | | | | | | |
| 6  0.5 to 1 | 7:3 | 0.05 to 0.1 | 5 to 15 | 87 | 4.00 | 702 |
| 7  0.5 to 1 | 7:3 | 2.4 to 10 | 5 to 15 | 143 | 4.00 | 707 |

It can be learned from comparison between Examples 1 and 12 to 14 and Comparative Examples 6 and 7 that when the particle sizes of the first active material particles were less than 0.1 μm, the active material particles were difficult to scatter and easy to agglomerate during mixing. In addition, when the first active material particles were too small, the particles were light and easy to occupy most polar groups in a molecular chain, which reduced a probability of contact between the binder and the current collector, and deteriorated the strength of binding between the first active material layer and the current collector. When the particle sizes of the first active material particles were greater than 2.3 μm, probabilities of forming pores between the particles of the first active material and the current collector and forming pores between the first binder particles and the active material particles increased, thereby decreasing the strength of binding between the first active material layer and the current collector.

Table 5 shows various parameters and evaluation results in Examples 1 and 15 to 17 and Comparative Example 8.

decreased, the cold pressing density decreased, and the energy density of the electrochemical apparatus decreased.

The above descriptions are only preferred embodiments of this application and explanations of the applied technical principles. Those skilled in the art should understand that the scope disclosed in this application is not limited to the technical solutions formed by the specific combination of the above technical features, and should also cover other technical solutions formed by any combination of the above technical features or their equivalent features, for example, a technical solution formed by replacement between the above features and technical features having similar functions disclosed in this application.

What is claimed is:

1. An electrochemical apparatus, comprising an electrode plate comprising:
   a current collector; and
   an active material layer provided on the current collector;
   wherein the active material layer comprises a first composite particle and a second composite particle; the first composite particle comprises a first active material particle and a first binder particle, wherein the first binder particle and the first active material particle in contact with the first binder particle form the first composite particle; the second composite particle comprises a second active material particle and a second binder particle, wherein the second binder particle and the second active material particle in contact with the

TABLE 5

| Particle size range of first binder particles polypropylene and second binder particles polypropylene (μm) | Mass percentage of first binder particles polypropylene:mass percentage of second binder particles polypropylene | Particle size range of first active material particles lithium cobalt oxide (μm) | Particle size range of second active material particles lithium cobalt oxide (μm) | Strength of binding between first active material layer and current collector (N/m) | Compacted density of positive electrode plate (g/cm$^3$) | Energy density of electrochemical apparatus (Wh/L) |
|---|---|---|---|---|---|---|
| Example | | | | | | |
| 1  0.5 to 1 | 7:3 | 0.5 to 1 | 5 to 15 | 150 | 4.00 | 707 |
| 15 0.5 to 1 | 7:3 | 0.5 to 1 | 2.3 to 8 | 150 | 4.02 | 708 |
| 16 0.5 to 1 | 7:3 | 0.5 to 1 | 8 to 15 | 150 | 4.00 | 707 |
| 17 0.5 to 1 | 7:3 | 0.5 to 1 | 12 to 30 | 150 | 3.93 | 702 |
| Comparative Example | | | | | | |
| 8  0.5 to 1 | 7:3 | 0.5 to 1 | 31 to 35 | 150 | 3.80 | 694 |

It can be learned from comparison between Examples 1 and 15 to 17 and Comparative Example 8 that an increase in particle sizes of the second active material particles did not affect the strength of binding between the first active material layer that was closer to the current collector and the current collector. However, if the particle sizes of the second active material particles were excessively large, an accumulation efficiency of the particles of the second active material second binder particle form the second composite particle; in a thickness direction of the active material layer, the first composite particle is closer to the current collector than the second composite particle, wherein a quantity of the first active material particle contained in the first composite particle is greater than a quantity of the second active material particle contained in the second composite particle; wherein a particle size of the first binder particle is greater than a particle size of a second binder particle; and components of both the first binder particle and the second binder particle comprise polypropylene.

2. The electrochemical apparatus according to claim 1, wherein the active material layer comprises a first active material layer and a second active material layer, the first active material layer comprises the first composite particle, and the second active material layer comprises the second composite particle.

3. The electrochemical apparatus according to claim 2, wherein a mass percentage of the first binder particle in the first active material layer to the first active material layer is A, and a mass percentage of the second binder particle in the second active material layer to the second active material layer is B, wherein A>B.

4. The electrochemical apparatus according to claim 3, wherein a ratio of A to B is 1.5 to 6.

5. The electrochemical apparatus according to claim 2, wherein on a cross section in a thickness direction of the electrode plate, a quantity of the first binder particle in the first active material layer per unit area is greater than a quantity of the second binder particle in the second active material layer per unit area.

6. The electrochemical apparatus according to claim 1, wherein a particle size of the first binder particle ranges from 0.06 µm to 6 µm, and a particle size of the second binder particle ranges from 0.05 µm to 5 µm.

7. The electrochemical apparatus according to claim 1, wherein the active material layer further comprises a third binder, and the third binder comprises at least one of polyacrylate, polyacrylic acid, polyacrylate, polymethyl methacrylate, polyacrylonitrile, polyamide, or carboxymethylcellulose sodium.

8. The electrochemical apparatus according to claim 7, wherein a mass ratio of polypropylene to the third binder in the active material layer 21 is 1:10 to 10:0.1.

9. The electrochemical apparatus according to claim 1, wherein a particle size of the first active material particle ranges from 0.1 µm to 2.3 µm, and a particle size of the second active material particle ranges from 2.31 µm to 30 am.

10. The electrochemical apparatus according to claim 1, wherein the electrode plate is a positive electrode plate, and the first active material particle and the second active material particle are each independently selected from at least one of lithium cobalt oxide, lithium iron phosphate, lithium manganese iron phosphate, sodium iron phosphate, lithium vanadium phosphate, sodium vanadium phosphate, lithium vanadyl phosphate, sodium vanadyl phosphate, lithium vanadate, lithium manganate oxide, lithium nicotinate, lithium nickel cobalt manganate, lithium-rich manganese-based material, or lithium nickel cobalt aluminate.

11. The electrochemical apparatus according to claim 1, wherein the electrode plate is a negative electrode plate, and the first active material particle and the second active material particle are each independently selected from at least one of artificial graphite, natural graphite, mesocarbon microbead, soft carbon, hard carbon, silicon, tin, silicon carbon, silicon oxygen, or lithium titanate.

12. The electrochemical apparatus according to claim 1, wherein the electrode plate is a positive electrode plater or a negative electrode plate.

13. The electrochemical apparatus according to claim 12, wherein the electrode plate is a positive electrode plate, and a compacted density of the active material layer is 1.0 g/cm$^3$ to 1.9 g/cm$^3$.

14. The electrochemical apparatus according to claim 12, wherein the electrode plate is a negative electrode plate, and a compacted density of the active material layer is 3.70 g/cm$^3$ to 4.10 g/cm$^3$.

15. The electrochemical apparatus according to claim 1, wherein polypropylene in the first binder particle is in contact with at least one of the first active material particle or the current collector.

16. The electrochemical apparatus according to claim 1, wherein polypropylene in the second binder particle is in contact with the second active material particle.

17. The electrochemical apparatus according to claim 1, wherein at least one of the first binder particle or the second binder particle is made of polypropylene.

18. An electronic apparatus, comprising an electrochemical apparatus, wherein the electrochemical apparatus comprises an electrode plate comprising: a current collector; and an active material layer provided on the current collector; wherein the active material layer comprises a first composite particle and a second composite particle; the first composite particle comprises a first active material particle and a first binder particle, wherein the first binder particle and the first active material particle in contact with the first binder particle form the first composite particle; the second composite particle comprises a second active material particle and a second binder particle, wherein the second binder particle and the second active material particle in contact with the second binder particle form the second composite particle; in a thickness direction of the active material layer, the first composite particle is closer to the current collector than the second composite particle, wherein a quantity of the first active material particle contained in the first composite particle is greater than a quantity of the second active material particle contained in the second composite particle; wherein a particle size of the first binder particle is greater than a particle size of the second binder particle; and components of both the first binder particle and the second binder particle comprise polypropylene.

19. The electronic apparatus according to claim 18, wherein the active material layer comprises a first active material layer and a second active material layer, the first active material layer comprises the first composite particle, and the second active material layer comprises the second composite particle.

* * * * *